United States Patent [19]
Yoshioka et al.

[11] 4,305,445
[45] Dec. 15, 1981

[54] LARGE-SIZED PNEUMATIC RADIAL TIRES

[75] Inventors: Makoto Yoshioka, Higashimurayama; Hiroshi Ogawa, Kodaira, both of Japan

[73] Assignees: Bridgestone Tire Company Limited; City of Sapporo, both of Tokyo, Japan

[21] Appl. No.: 138,396

[22] Filed: Apr. 8, 1980

[30] Foreign Application Priority Data

Apr. 18, 1979 [JP] Japan ............................ 54-48372

[51] Int. Cl.³ .............................................. B60C 11/00
[52] U.S. Cl. ........................... 152/209 R; 152/354 R; 152/361 R; D12/143
[58] Field of Search ....... 192/209 D, 209 R, 209 WT, 192/209 NT, 209 A, 350 R, 352 R, 361 R; D12/142, 143, 146, 141

[56] References Cited

U.S. PATENT DOCUMENTS 3,550,665 12/1970 Verdier ........................... 152/209 R
3,645,313 2/1972 Roberts ........................... 152/209 R
4,031,938 6/1977 Verdier ........................... 152/209 R

FOREIGN PATENT DOCUMENTS 116250 12/1942 Australia ............................ 152/209

Primary Examiner—John E. Kittle
Assistant Examiner—Thomas Bokan
Attorney, Agent, or Firm—Sughrue, Mion, Zinn, Macpeak & Seas

[57] ABSTRACT

A large-sized pneumatic radial tire is disclosed. The tire comprises a tread including grooves, a belt composed of a plurality of rubberized layers each containing steel cords, and a carcass of a substantially radial construction. The tread includes two half regions divided with respect to a crown center, one a region in a direction of plysteer due to the tire construction and the ground contact reaction force acting on steel cords of at least one rubberized layer disposed near the tread, and the other being a region opposite to the direction of plysteer. A row of small holes are formed in an island part along its edge near the kicking-out side of the groove in the region opposite to the direction of plysteer.

9 Claims, 8 Drawing Figures

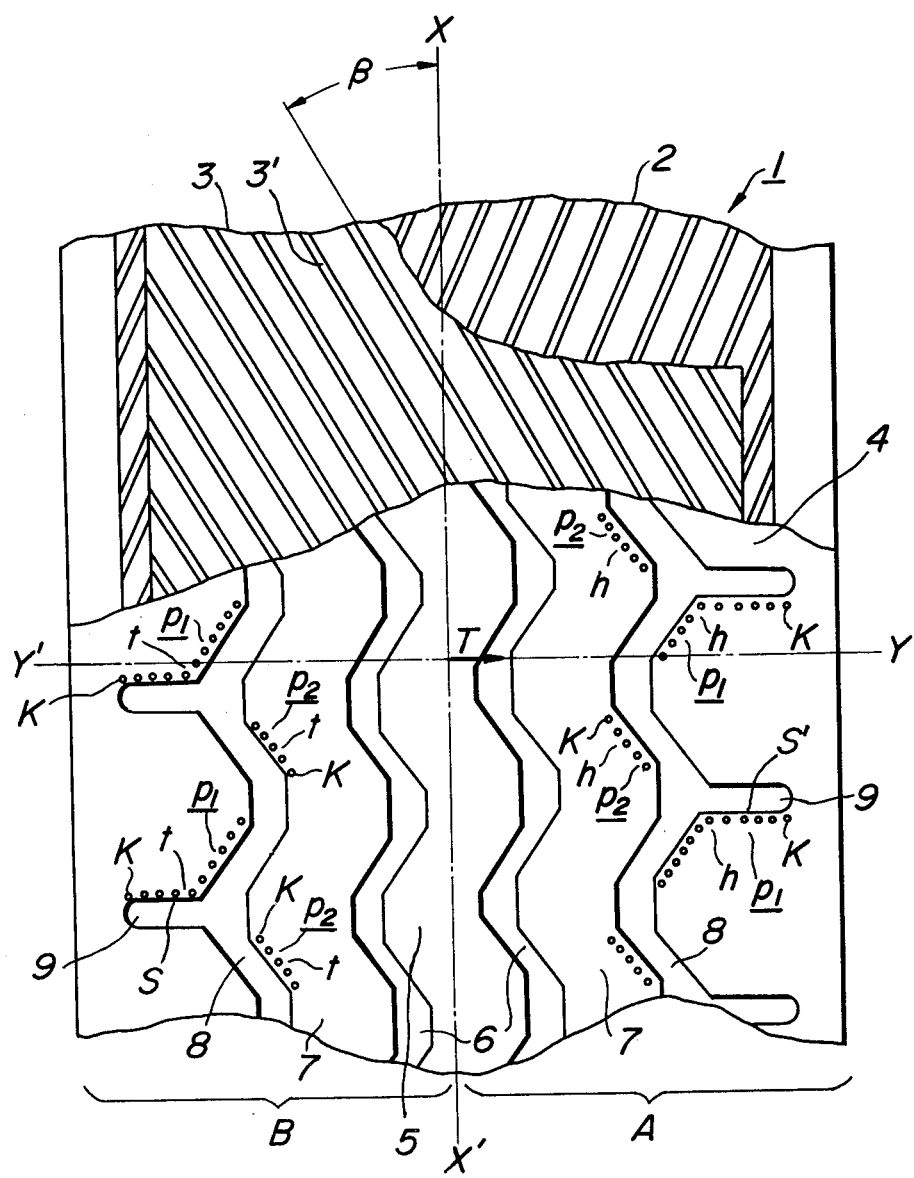

FIG. 4a
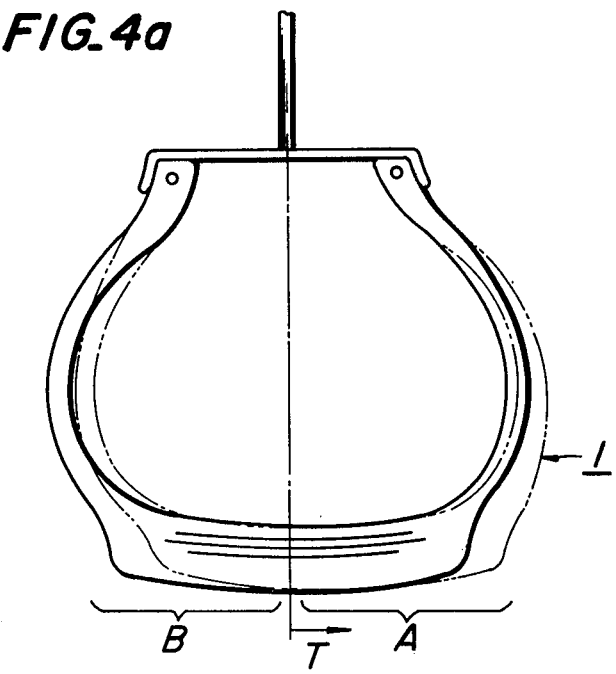
FIG. 4b Distribution of Ground Contact Pressure
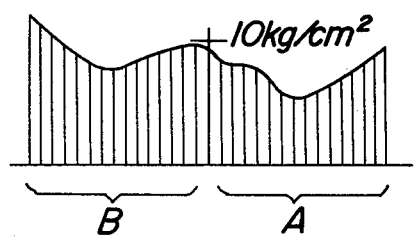
FIG. 4c Distribution of Circumferential Lagging Amount of Tread
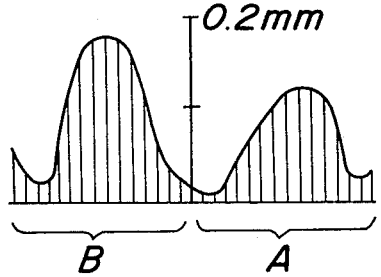

LARGE-SIZED PNEUMATIC RADIAL TIRES

This invention relates to large-sized pneumatic radial tires, and more particularly, to an improvement for tread configuration of large-sized pneumatic radial tires.

In the tires of this type, there is provided a carcass of a substantially radial construction and a belt is superimposed intimately about the carcass, serving as a reinforcement for the tire. This belt is generally composed of a plurality of rubberized cord layers, at least one layer being composed of steel cords and frequently disposed near a tread of the tire.

Such large-sized pneumatic radial tires are particularly used in a flat form having an aspect ratio of not more than 0.9 for highway bus and truck, monorail vehicle, electric car, and the like. In these applications, however, a peculiar and abnormal wear has been encountered that shortens the wear-resistant life of the tire.

That is, when a vehicle provided with such tires goes straight forward or backward on good road, for example, a general driveway paved with concrete, asphalt and so on or a single-purpose track for monorail vehicle or electric car, as shown in FIG. 1, the abnormal wear is concentrically caused in shadowed portions along grooves in the tread near both shoulder sides of the tire, particularly one-side edges S, S' of tread grooves g, g' extending substantially in a widthwise direction of tire. FIG. 1 shows a schematic illustration of tread configuration in the tire of this type viewed from the rear side of the vehicle, the rotating direction of tire being shown by an arrow. Surprisingly, the abnormal wear is formed at a kicking-out side or toe side t of a tread element e in a left half region B viewed from a center line X—X' of a crown and also at a stepping-in side or heel side h of the tread element e in a right half region A.

According to general experience relating to the pneumatic radial tire, it has been confirmed that a stepped wear or so-called "heel and toe" wear is formed at the kicking-out side t due to the following fact; that is, at that portion of the tread element firstly contacting with ground during the rotating of the tire, i.e. stepping-in side h, the ground contact pressure gradually increases as the ground contact area becomes large and then gradually decreases as the stepping-in side h leaves from ground. But, at the kicking-out side t contacting with ground followed to the stepping-in side h, the increase of ground contact pressure is small owing to the presence of succeeding tread grooves g, g' and the kicking-out side t is liable to be displaced toward the tread grooves g, g'. A lagging movement of the kicking-out region accompanied with such displacement is caused against ground before the ground contact pressure reaches to a sufficient value.

In general, a tread pattern of the tire is constructed with groove parts and island parts. The island parts are called as ribs, lugs and blocks in accordance with their form and the groove parts are called as main grooves, lateral grooves, branch grooves, fine grooves, sipes and the like in accordance with their form. In any island parts, which are divided in a circumferential direction of tire by two groove parts inclined, as shown in FIG. 1, at an angle α of 0°–90° with respect to the circumferential direction and arranged at a given interval in the circumferential direction, that portion of the island part early contacting with ground during the rotating in a given direction is defined as the stepping-in side h and that portion of the island part late contacting with ground is defined as the kicking-out side t. Of course, both the sides h and t become opposite when the rotating direction of the tire is reversed.

In the aforesaid applications, the phenomenon of such stepped wear has been observed only at the kicking-out side in the left half region of tire and only at the stepping-in side in the right half region of tire as shown in FIG. 1, which will be described below.

A pattern of tread grooves used for tread configuration of tire is variously selected in accordance with the performance required for the tire such as breaking performance, cornering performance and the like. In general, such pattern is a series of repeated pattern units with respect to the circumferential direction of tire, provided that the half portions of the pattern unit are symmetrically arranged at the left and right half regions viewed from the crown center while shifting these portions at a half pitch with each other in the circumferential direction. In case of tires for passenger car, construction vehicle or agricultural vehicle, the half portions of pattern unit may be unsymmetrically arranged at the left and right half regions viewed from the crown center. In the applications desired by the invention as mentioned above, however, such unsymmetrical patterns are not usually adopted.

Moreover, the cross-section of the tread groove is usually V-shaped with the angles of the walls of the groove in the vicinity of 5° with respect to a vertical line of tread surface. With the foregoing in mind, the different wear behaviors at the left and right half regions viewed from the crown center are grasped as a peculiar phenomenon inherent to the large-sized pneumatic radial tire according to the invention.

Now, the inventors have made various studies with respect to the main cause of such peculiar phenomenon and found out that this phenomenon is closely related to the construction of tire.

Specifically, in the large-sized pneumatic radial tire of this type it has been found that the portions causing the above mentioned peculiar wear are determined by a direction of internal camber thrust acting upon the tire (hereinafter referred to as plysteer), which is produced due to the tire construction and to a ground contact reaction force acting on steel cords of at least one rubberized layer disposed near the tread and constituting a belt as a reinforcing member together with a carcass.

Such plysteer is indicated by an arrow T directing in the Y direction as shown in FIG. 2 when the tire is rotated in an upward direction. In FIG. 2 is illustrated a cord arrangement of steel cord layers in the large-sized pneumatic radial tire 1, wherein a carcass (not shown) of the tire 1 is surrounded with a belt composed of several steel cord layers 2, 3, among which at least one cord layer disposed near the tread 4 is constituted with steel cords 3' each having a high rigidity and inclined at a given angle $\beta$ with respect to the circumferential direction of tire.

Further, the inventors have made various observations and examinations in detail with respect to the tire shown in FIG. 2. As a result, it has been found that when the rotation of the tire is set in a given direction, the abnormal wear relating to FIG. 1 is caused only at the left half region B of the tread viewed from the crown center X-X' and is hardly caused at the remaining right half region A of the tread. Moreover, it has been confirmed that if the rotation of the tire is reversed, the abnormal wear is first caused at the right half region A of the tread because the stepping-in side h of the tread element is converted into the kicking-out side t due to the reversal rotation of tire.

As seen from the above, the abnormal wear shown in FIG. 1 is recognized to be apparently a composite phenomenon developed by complicating the wears at the left and right half regions of the tread with each other for each rotating direction of tire when the tires provided on the vehicle are run with the change of location at a suitable time or when the rotating direction of tire is altered by shuttling of an electric car on tracks provided with the tires.

Hence, the development of abnormal wear at different positions depends upon the rotating direction of tire. In the embodiment of FIG. 2, when the tire is rotated in an upward direction, the abnormal wear is caused only at the left half region B viewed from the crown center X-X' as shown in FIG. 3a, while when the tire is rotated in a downward direction, the abnormal wear is caused only at the right half region A as shown in FIG. 3b.

Such phenomenon of developing the wear only at each half region of the tread is investigated as follows.

That is, when plysteer T is produced during the rotating of tire in an upward direction, the tire 1 is slightly deformed toward a direction of plysteer T as shown by a dot-dash-line in FIG. 4a. As a result, a shoulder portion at the right half region A of the tread slightly rises relative to the ground surface and has a ground contact pressure lower than that of a shoulder portion at the remaining left half region B of the tread as shown in FIG. 4b.

Thus, the ground contact reaction force of the tread element e (FIG. 1) becomes large at the left half region of the tread having a high ground contact pressure, so that this tread element is apt to be lagged against ground surface and particularly, the lagging of the tread element is concentrically caused on an edge of tread groove at the kicking-out side as shown in FIG. 4c. As a result, local wear is formed on the edge of the tread groove as the kicking-out side of the tread element.

On a basis of the above analysis, there have hitherto been proposed reinforcing means for suppressing the movement of that portion of the tread element which is apt to cause the wear as far as possible.

On the contrary, the inventors have found out that it is more favorable to mitigate the stress concentration in that portion of the tread element by reducing the rigidity of such portion opposite to the aforementioned reinforcing means of the prior art since, this portion cannot avoid forced displacement.

According to the invention, there is provided a large-sized pneumatic radial tire comprising a tread including grooves, a belt composed of a plurality of rubberized layers each containing steel cords, and a carcass of a substantially radial construction; said tread including two half regions divided with respect to a crown center, one of said regions being a region in a direction of plysteer which is produced due to the tire construction and to the ground contact reaction force acting on said steel cord of at least one rubberized layer disposed near said tread and which acts upon the tire, and the other region being a region opposite to the direction of plysteer. The invention is characterized by forming a row of small holes in an island part along its edge near the kicking-out sides of said grooves in said region opposite to the direction of plysteer to mitigate the stress concentration in said island part. The small holes have a depth corresponding to 0.3–1.0 times of the depth of the groove and are arranged at a substantially equal interval corresponding to a size of said groove depth.

In a preferred embodiment of the invention, a row of small holes are also formed in an island part along its edge near the stepping-in sides of the grooves in the half region in the direction of plysteer to mitigate the stress concentration in the island part. Hence, the tire is preferably used in applications of alternately reversing the rotating direction of tire.

BRIEF DESCRIPTION OF THE DRAWINGS

The invention will now be described in greater detail with reference to the accompanying drawings, wherein:

FIG. 2 is a partial schematic view of an embodiment of the tire according to the invention showing steel cords of a belt in an exposed state by partly cutting out tread rubber from tread surface;

FIG. 4a is a schematically sectional view of the tire deformed by plysteer produced in the rotation of tire;

FIGS. 4b and 4c are graphical representations showing distributions of ground contact pressure and circumferential lagging amount of the tread in the tire of FIG. 4a, respectively.

Figure 1:
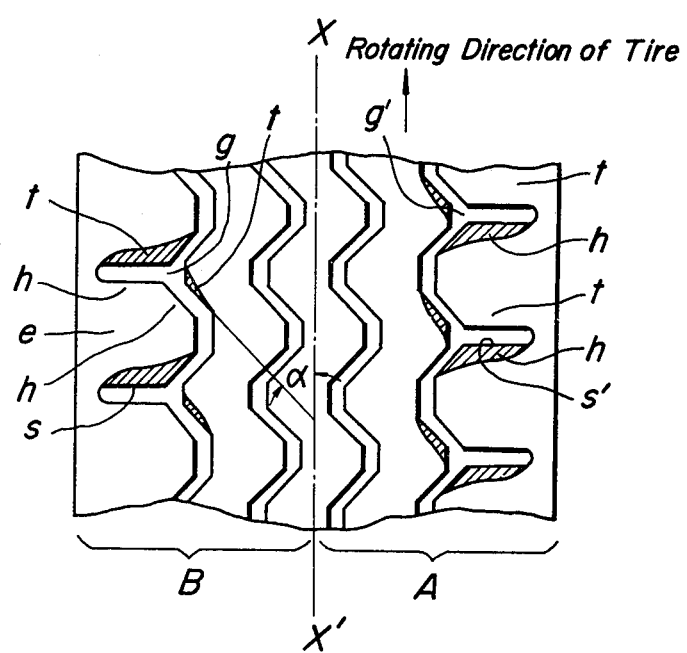
FIG. 1 is a partial schematic view of a rubber tire for electric car illustrating a peculiar wear caused at its tread pattern.
Figure 3A:
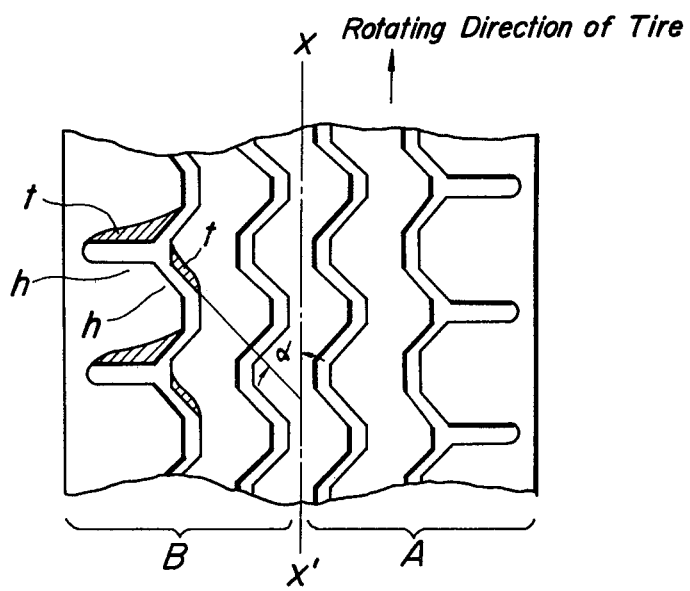
FIG. 3a is a partial schematic view of the tire shown in FIG. 2 illustrating the abnormal wear phenomenon caused during the rotating of tire in an upward direction.
Figure 3B:
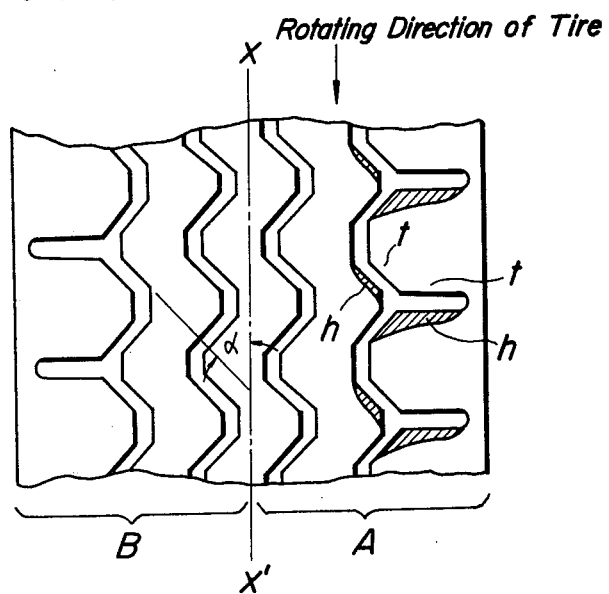
FIG. 3b is a partial schematic view of the tire shown in FIG. 2 illustrating the abnormal wear phenomenon caused during the rotating of tire in a downward direction.

In the embodiment of FIG. 2, the pattern of tread groove comprises a center rib 5, a pair of zigzag type tread center grooves 6 surrounding the center rib, a pair of side ribs 7 disposed outside each of the tread center grooves, and a pair of zigzag type tread side grooves 8 disposed outside each of the side ribs. The tread side groove 8 has a plurality of lateral subgrooves 9 each extending from the protruded portions of the groove 8 toward a shoulder portion of the tire.

In such a pattern, the wear is liable to be concentrically caused along edges of the side groove 8 and subgroove 9 at the kicking-out side t in the left half region B of the tread of the tire 1 as shown in FIG. 1. Therefore, a measure is taken for mitigating the stress in an island part near the walls of these grooves 8 and 9. In this case, the edge of the island part near the groove wall for the mitigation of stress should be inclined at an angle $\alpha$ of 30°–90° with respect to the circumferential direction of tire.

In the applications of alternately reversing the rotating direction of tire, a similar stress-mitigating measure may be provided along at the remaining right half region A of the tread.

Figure 5:
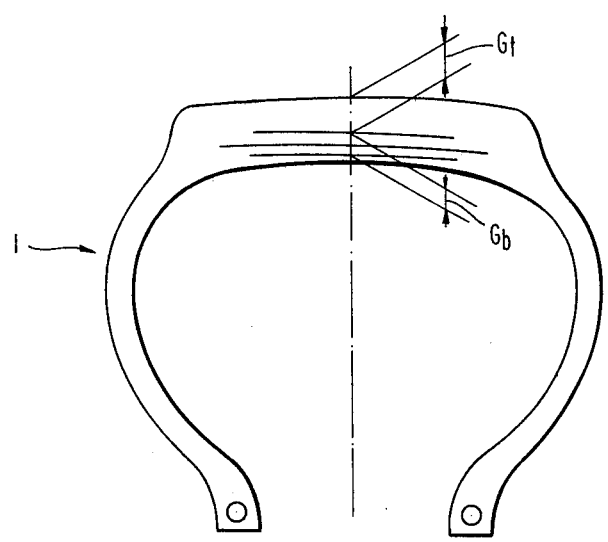
FIG. 5 is a schematic sectional view of a tire showing the ratio of tread gauge to total belt gauge.

Such stress-mitigating measure is particularly effective for tires having an aspect ratio of not more than 0.9. Because, in the tire of this type, the width of the belt is large so that the tire is strongly influenced by the plysteer acting on the outermost cord layer, particularly steel cord layer among cord layers constituting the belt. Further, as shown in FIG. 5, the invention is preferably adapted to large-sized tires having a ratio (Gt/Gb) of tread rubber gauge (Gt) to belt total gauge (Gb) of 0.7-2.5, preferably about 0.9-2.0 in the crown center of the tread because the development of abnormal wear is considerably influenced by the cord layer disposed immediately beneath the tread. In the later case, as shown in FIG. 5 the tread rubber gauge (Gt) is a distance between the surface of the tread and the surface of the outermost cord layer constituting the belt in the crown center and the belt total gauge (Gb) is a sum of thicknesses of cord layers constituting the belt in the crown center.

The stress-mitigating measure according to the invention will concretely be described with reference to FIG. 2.

As the stress-mitigating measure, a row of small holes K are formed in an island part near the wall of the side groove 8 and subgroove 9 having a tendency to cause the above mentioned abnormal wear along their edges on the kicking-out side t in the left half region B and/or the stepping-in side h in the right half region A.

The depth of the small hole K is 0.3-1.0 times of the depth of the side groove 8 and subgroove 9 facing on the edge of that island part having the small holes therein. When the depth of the small hole is too shallow, there is no effect by the formation of the small holes. When the depth is too deep, a problem results in that the bottom of the small hole reaches to the belt layer.

These small holes K are arranged at a substantially equal interval. The term "substantially equal interval" used herein means that the interval is not strictly defined as far as there is caused no great difference in the stress-mitigating degree between the groove edges S and S'.

The interval defined by a distance between the edges of the adjoining small holes K has a size corresponding to the depth of the side groove 8 and subgroove 9 facing on the edge of the island part having the small holes therein. When the interval exceeds the range of the groove depth, the effect of stress mitigation is deteriorated and the presence of the small holes is useless. Moreover, the shallower the depth of the groove defining the interval between the adjoining small holes K, the smaller the distance from the outermost belt layer 3 to the tread surface. Hence, the edge of the island part is strongly influenced by the cords 3' of the outermost belt layer 3. Therefore, when the groove depth becomes shallower, it is necessary to make the interval between the adjoining small holes narrow, whereby the effect of stress mitigation is improved.

The small holes K may have several different hole diameters. In this case, it is desirable that a ratio of maximum hole diameter to minimum hole diameter is within a range of 1-3. When such a ratio is outside the above range, there is a possibility of causing the abnormal wear about the edge of the small hole K.

Further, another problem, which will be caused due to the stress concentration in the dge of the small hole, may advantageously be avoided by making the small hole K into a substantially circle or ellipse form. In practice, the small hole K is desirably a circle with a diameter of 0.5-4 mm, preferably 1-2 mm.

According to the invention, it is preferable that the interval between the adjoining small holes K is 2-5 mm and the position of the small holes K in the island part is within a range of 0.5-10 mm measured inwardly from the edge of the island part.

In the practice of the invention, the small holes may be formed along the groove edge in addition to the above defined groove edges S, S'. In this case, it is an essential feature that the number of small holes along the groove edges S, S' is relatively larger than that along the other groove edge in order to achieve the considerable stress mitigation in the particular groove edges S, S'.

The invention will be described with reference to the following example.

In the tread pattern of FIG. 2, the small holes K were formed in the island parts on the kicking-out sides t of the tread element in the left half region B and the stepping-in sides h of the tread element in the right half region A. In this case, a row of small holes K each having a diameter of 1.5 mm and the same depth of 8 mm as that of the side groove 8 and subgroove 9 were arranged at an equal interval of 3 mm between the edges of the adjoining small holes and at a distance of 1.0 mm between the edge of the island part and the edge of the small hole. As a result, the wear-resistant life of the tread was increased to 1.5 times of that taking no stress-mitigating measure as mentioned above.

In the embodiment of FIG. 2, the small holes K are arranged in the island parts $P_1$ and $P_2$ of the tread element, but the small hole K may be arranged only in the island part $P_1$ in accordance with the degree of the abnormal wear to be anticipated.

According to the invention, the peculiar abnormal wear of the tread caused by the plysteer due to the tire construction of the large-sized pneumatic radial tire can advantageously be prevented by the formation of small holes having different diameters as a simple stress-mitigating measure without obstructing the various performances required for the tire of this type.

What is claimed is:

1. A large-sized pneumatic radial tire comprising a tread including grooves having alternately directed inclined portions at an angle of 30°-90° with respect to the circumferential direction of the tire, a belt composed of a plurality of rubberized layers each containing steel cords, and a carcass of a substantially radial construction, said tread including two half regions divided with respect to a crown center, one of said regions being a region in a direction of plysteer which is produced due to the tire construction and to the ground contact reaction force acting on said steel cord of at least one rubberized layer disposed near said tread and which acts upon the tire, and the other region being a region opposite to the direction of plysteer; characterized by forming a row of small holes only in an island part along its edge near the kicking-out sides of said grooves in said region opposite to the direction of plysteer, said small holes having a depth corresponding to 0.3-1.0 times the depth of said grooves and being arranged at a substantially equal interval corresponding to a size of said grooves depth.

2. A large-sized pneumatic radial tire as claimed in claim 1, wherein a row of said small holes are only formed in an island part along its edge near the stepping-in sides of said inclined portions of said grooves in said region in the direction of plysteer.

3. A large-sized pneumatic radial tire as claimed in claim 1, wherein said tire has an aspect ratio of not more than 0.9.

4. A large-sized pneumatic radial tire as claimed in claim 1, wherein said tire has a ratio of tread rubber gauge to belt total gauge of 0.7-2.5, preferably 0.9-2.0 in the crown center of said tread.

5. A large-sized pneumatic radial tire as claimed in claim 1, wherein said small holes have different hole diameters and a ratio of maximum hole diameter to minimum hole diameter is within a range of 1-3.

6. A large-sized pneumatic radial tire as claimed in claim 1, wherein said small hole is substantially a circular hole.

7. A large-sized pneumatic radial tire as claimed in claim 6, wherein said circular hole has a diameter of 0.5-4 mm, preferably 1-2 mm.

8. A large-sized pneumatic radial tire as claimed in claim 1, wherein said interval between the small holes is 2-5 mm.

9. A large-sized pneumatic radial tire as claimed in claim 1, wherein said small holes are located at a distance of 0.5-10 mm measured inwardly from the edge of said island part.

* * * * *